(12) United States Patent
Park et al.

(10) Patent No.: US 6,385,437 B1
(45) Date of Patent: *May 7, 2002

(54) POWER CONTROL APPARATUS AND METHOD FOR INTER-FREQUENCY HANDOFF IN CDMA COMMUNICATION SYSTEM

(75) Inventors: Chang-Soo Park, Seoul; Jae-Min Ahn, Kangnam-gu; Jae-Yoel Kim, Kyonggi-do; Hee-Won Kang, Seoul, all of (KR)

(73) Assignee: Samsung Electronics, Co., Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/503,764

(22) Filed: Feb. 14, 2000

(30) Foreign Application Priority Data

Feb. 13, 1999  (KR) .............................. 99-5263

(51) Int. Cl.$^7$ ................................................ H04B 1/00
(52) U.S. Cl. ......................................... 455/69; 455/522
(58) Field of Search ............................ 455/522, 69, 72

(56) References Cited

U.S. PATENT DOCUMENTS 5,751,763 A * 5/1998 Bruckert ..................... 375/200
6,289,009 B1 * 9/2001 Sato .......................... 370/342
2001/0011461 A1 * 8/2001 Uesugi ....................... 455/522

* cited by examiner

*Primary Examiner*—Daniel Hunter
*Assistant Examiner*—Khawar Iqbal
(74) *Attorney, Agent, or Firm*—Dilworth & Barrese, LLP

(57) ABSTRACT

Disclosed is a power control method for a mobile station which has at least one compressed mode frame. A compressed mode frame includes a data transmission duration where data is transmitted at a first frequency, and a data transmission-off duration where a second frequency is searched to perform an inter-frequency handoff to the second frequency. The transmission power during the data transmission duration is increased to compensate for the loss of transmission power during the data transmission-off duration. In the method, a base station sets a power control threshold depending on the length of the data transmission-off duration. The base station receives transmission power-increased data and compares the received power of the data signal with the power control threshold. The base station generates a power-up command when the power control threshold is higher than the receiving power, and generates a power-down command when the power control threshold is lower than the receiving power.

13 Claims, 7 Drawing Sheets

POWER CONTROL APPARATUS AND METHOD FOR INTER-FREQUENCY HANDOFF IN CDMA COMMUNICATION SYSTEM

PRIORITY

This application claims priority to an application entitled "Power Control Apparatus and Method for Inter-Frequency Handoff in CDMA Communication System" filed in the Korean Industrial Property Office on Feb. 13, 1999 and assigned Ser. No. 99-5263, the contents of which are hereby incorporated by reference.

BACKGROUND OF THE INVENTION

1. Field of the Invention

The present invention relates generally to a power control apparatus and method for a mobile communication system, and in particular, to an apparatus and method for performing power control during inter-frequency hard handoff.

2. Description of the Related Art

In general, many mobile communication systems use a Code Division Multiple Access (CDMA) technique. For power control in the reverse link of a CDMA system, the base station measures the strength of the pilot signal transmitted from a mobile station and compares the measured value with a predetermined power control threshold. When the measured pilot signal strength is lower than the threshold, the base station generates a power-up command, and otherwise, when the measured pilot signal strength is higher than the threshold, the base station generates a power-down command. The base station transmits the power control command back to the mobile station in order to control transmission power of the mobile station transmitter. Generally, the power control threshold is set to a predetermined step value according to whether or not there exists a frame error after channel decoding.

In a system where the mobile station and the base station exchange data at certain frequencies, there are times when the frequency being used needs to be changed. The process for changing the frequency is referred to as inter-frequency handoff. Cases of inter-frequency handoff include (1) when the mobile station changes to a frequency of a base station other than the present base station in service, (2) when the mobile station changes from the present frequency to another frequency because of a lack of system capacity for the present frequency or the present frequency has a bad channel environment, and (3) when the mobile station changes from one communication technique to another communication technique.

As one of the initial steps in performing inter-frequency handoff, the base station sends a message commanding the mobile station to measure the channel condition of the new frequency. Upon receipt of the message, the mobile station changes (or shifts) the transmission/reception (Tx/Rx) frequency to the other frequency, measures the strength of the received signal at the changed frequency (or measures $E_c/I_{or}$, the energy to interference ratio of the received signal), and then returns to the original frequency. This may occur within a specific frame or over two frames. When measuring the channel condition of the different frequency, transmission of the signal on the original frequency will be interrupted for a moment due to the change of the frequency. This is because the mobile station, using a single frequency synthesizer, simultaneously changes the Tx frequency and the Rx frequency. In order to compensate for the energy loss due to the interruption in signal transmission at one portion within a frame, the mobile station increases transmission power at the other portion within the frame. Here, losing a certain duration within the frame in order to measure the channel condition of the different frequency is referred to as slotted mode (or compressed mode). In slotted mode, the data rate is increased by controlling the spreading factor (SF) at the remaining data transmission duration within the frame. This allows the transmission of data, which would have been transmitted during the non-transmission duration or interruption, during the remaining data transmission duration. In this case, the transmission power at the transmission duration is increased to compensate for the energy loss at the non-transmission duration.

Thus, because the transmission power temporarily increases at the portions of the frame other than the duration where the mobile station measures the channel condition of a target frequency, the power control performed between the base station and the mobile station needs to be changed. The power control process will become more apparent from the following description. Herein, the first frequency refers to the frequency at which the mobile station transmits presently, and the second frequency refers to the target frequency to which the mobile station will move when it performs the inter-frequency handoff.

The base station instructs the mobile station to measure the channel condition of the second frequency, and the mobile station interrupts transmission during a specific part of the frame in order to measure the channel condition of the second frequency according to the base station's instruction. However, the base station cannot know the exact starting point and duration of the interrupted transmission. That is, because the mobile station measures the channel condition of the second frequency unilaterally without forewarning the base station as to the starting point and duration of the interrupted transmission, the base station does not know the exact transmission-off or interruption duration. The base station will receive all the frame data, including the pure interference signal received during the transmission-off duration, and transmit the entire frame to the channel decoder. Therefore, a receiver of the base station will decode the pure interference signal, mistaking the interference signal for traffic data. In this case, the error rate of the decoded traffic data increases as compared with the case where the portion corresponding to the interference signal is set to '0' indicating a undecided value. The undecided value to is set to '0' on the assumption that the transmitted values are +1 and −1 ('0' having been binary-mapped to '+1 ' and '1' to '−1' before transmission). To prevent this, the base station and the mobile station exchange information about the exact starting point and duration ($t_{search}$ [ms]) of the transmission-off duration through signaling (hereinafter, the information exchanged between the base station and the mobile station will be referred to as inter-frequency hard handoff signaling). The mobile station changes from the first frequency to the second frequency according to the inter-frequency hard handoff signaling, and measures the channel condition of the second frequency.

FIG. 1 shows the variation in mobile station transmission power during the initial stages of an inter-frequency handoff according to the prior art. The term "regular power control" as used herein means that the mobile (or base station) increases or decreases the transmission power by a predetermined step size according to a power control command transmitted from the base station (or mobile station). For example, the predetermined step size can be set to ±0.25, 0.5 1.0 or 2.0 dB. Power control is performed on a power control group (PCG) unit basis, wherein the frame length is a multiple of the power control group.

Referring to FIG. 1, the mobile station transmits a signal by performing regular power control until time A, when it increases the transmission power by $\Delta_{search}$ [dB ], in order to compensate for the loss of the transmission signal during the transmission-off duration $t_{search}$ [ms] when the channel condition of the second frequency is measured. During frame durations A–D, the base station maintains the previous threshold for the received pilot signal power even though there is a transmission-off duration during this time period. Therefore, when the mobile station increases the transmission power at time A, the pilot signal power received at the base station after time A is higher than the threshold, so that the base station continuously sends a power-down command to the mobile station. If the mobile station obeyed the power-down command, it would be meaningless to increase the transmission power in the first place. Therefore, the mobile station disregards the power-down command and obeys only the power-up command from the base station during the frame when the channel condition of the second frequency is measured. Between time B and time C, the mobile station changes its frequency from the first frequency to the second frequency in order to measure the channel condition of the second frequency by measuring the traffic signal power or the pilot signal power received at the second frequency. At time C, the mobile station changes its frequency from the second frequency back to the first frequency, and transmits the transmission signal at the first frequency while still disregarding the power-down command. At time D, when the frame ends, the mobile station decreases the transmission power by $\Delta_{search}$ [dB] and then performs regular power control.

FIG. 2 shows the variation in transmission power of a base station during the initial stages of an inter-frequency handoff according to the prior art. Referring to FIG. 2, the transmission power of the base station undergoes regular power control until time A. Before the frame containing the signal transmission interruption is transmitted, the mobile station increases the power control threshold (or target $E_b/N_o$) of the mobile station by $\Delta_{target}$ [dB]. This increased power control threshold results in the mobile station transmitting power-up commands to the base station at point A, before the frame starts at point B. The additional increment $\Delta_{target}$ [dB] to the power control threshold during the compressed mode of the mobile station can vary depending on the time duration $t_{search}$ and can be determined through experiments. Since the power control threshold of the mobile station has increased, the mobile station continuously sends the base station a power-up command from the time A on, resulting in the base station increasing the transmission power, as shown from time A to time C. The power-up command may be continuously transmitted until the frequency is shifted to the second frequency at time C. At time D, where the frequency switch ends, the base station returns to the original frequency and continues the interrupted data transmission using the first frequency. At time E, when the frame ends, the mobile station decreases the power control threshold by $\Delta_{target}$ [dB].

In the existing power control method described with reference to FIGS. 1 and 2, the mobile station takes the initiative in measuring the channel condition of the second frequency for the inter-frequency handoff. The power control is performed by changing the transmission power of the mobile station as shown in FIG. 1, or by changing the power control threshold of the mobile station as shown in FIG. 2.

The existing method for measuring the channel condition of the second frequency for the inter-frequency handoff has several disadvantages. In the power control method of FIG. 1, in which the mobile station disregards the power-down command transmitted from the base station, if the mobile station experiences deep fading, the mobile station obeys the power-up command and increases its transmit power. Thereafter the channel condition become better, the mobile station disregards the power-down command, thereby resulting in a waste of the transmission power. In addition, data transmission at higher transmission power increases interference in the reverse link, thus causing a decrease in the capacity of the reverse link. Further, in the power control method of FIG. 2, when the power control step size is small, the mobile station needs to transmit the power-up command for a quite long time in order to increase the transmission power to the desired value. In this case, there is a portion in a previous frame where the regular power control cannot be performed, even though that frame does not have an interrupted transmission duration.

Therefore, there is a need for a method of using regular power control without disregarding the power-down command during the initial stages of the inter-frequency handoff, when power control occurs, as well as a method for rapidly controlling transmission power of the base station by a desired value.

SUMMARY OF THE INVENTION

It is, therefore, an object of the present invention to provide a device and method for performing regular power control for a frame duration, which includes a target frequency measuring duration, during an inter-frequency handoff in a mobile communication system.

It is another object of the present invention to provide a device and method for rapidly controlling frame transmission power by a desired value during an inter-frequency handoff in a mobile communication system.

It is further another object of the present invention to provide a device and method for performing regular power control for a frame duration, which includes a transmission-off duration, during an inter-frequency handoff in a mobile communication system.

To achieve the above object, a power control method for a mobile station having transmission frames is disclosed, at least one transmission frame including a transmission duration when data is transmitted on a first frequency, and a transmission-off duration when no data is transmitted on the first frequency and a second frequency is searched in order to perform an inter-frequency handoff to the second frequency, said transmission duration having increased transmission power in order to compensate for a loss of transmission power on the first frequency during the transmission-off duration, the method comprising the steps of: setting, in a base station, a power control threshold depending on a length of the transmission-off duration; and receiving, in the base station, transmission power-increased data; comparing the power of the received signal with the power control threshold; generating a power-up command when the power control threshold is higher than the received signal power; and generating a power-down command when the power control threshold is lower than the received signal power.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
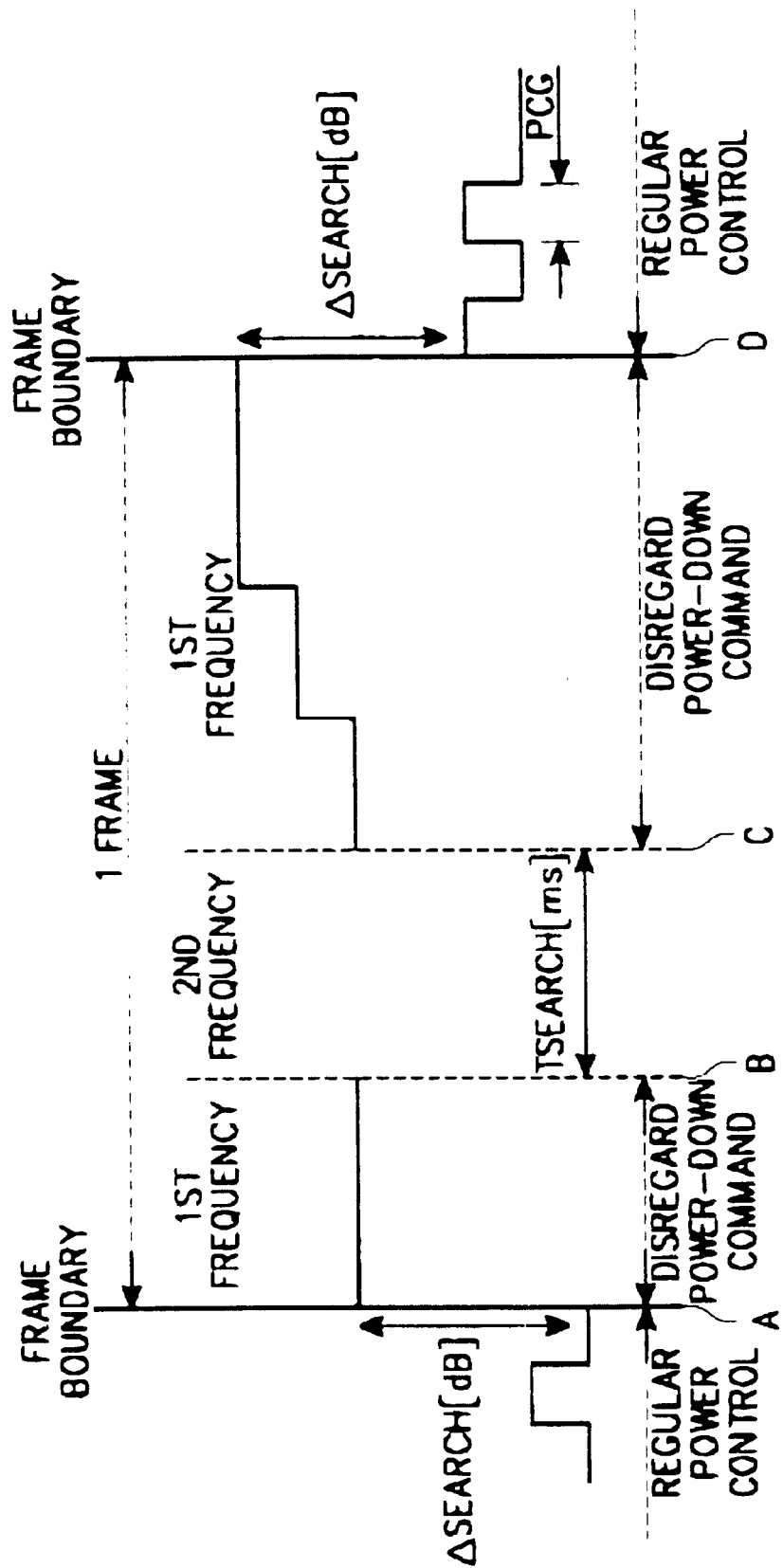
FIG. 1 shows an example of variation in transmission power of a mobile station during an inter-frequency handoff according to the prior art.
Figure 2:
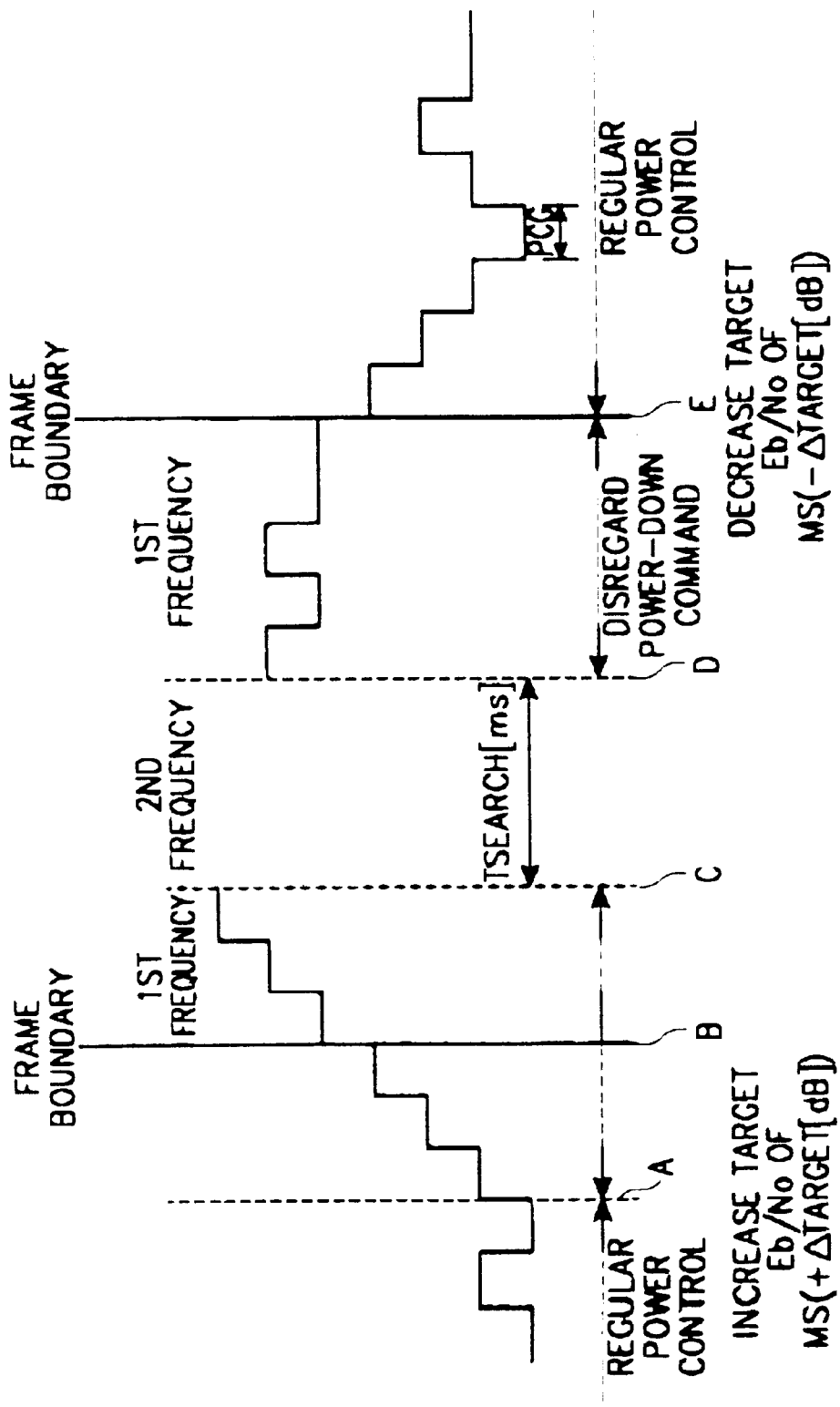
FIG. 2 shows an example of variation in transmission power of a base station during an inter-frequency handoff according to the prior art.

A preferred embodiment of the present invention will be described herein below with reference to the accompanying drawings. In the following description, well-known functions or constructions are not described in detail since they would obscure the invention in unnecessary detail.

In a power control method during the initial stages of an inter-frequency handoff according to an embodiment of the present invention, the mobile station increases transmission power at the starting point of the frame by the same amount as the transmission power lost at the transmission-off duration of the frame, in order to compensate for a loss of the transmission power due to interruption of data transmission. At the same time, the mobile station changes the power control threshold of the base station so that regular power control may be performed. Because this power control method performs regular power control even in the frame where signal transmission is interrupted, the method thereby prevents a decrease in capacity of the reverse link according to an increase in interference due to excessive transmission power. In addition, the preferred embodiment of the present invention increases, in the base station, transmission power at the starting point of the frame as much as the transmission power lost at the transmission-off duration of the frame, in order to compensate for the loss of transmission power due to the interruption of data transmission. At the same time, the base station changes the power control threshold of the mobile station so that regular power control may be performed.

First, to perform the inter-frequency handoff, the base station and the mobile station exchange information about the transmission-off starting time and transmission-off duration through inter-frequency handoff signaling. The base station sends inter-frequency handoff signaling to the mobile station, and then the mobile station sends an acknowledge (ACK) or negative acknowledge (NACK) in response to the inter-frequency handoff signaling. Alternatively, the mobile station sends the inter-frequency handoff signaling to the base station, and then the base station sends an ACK or NACK in response to the inter-frequency handoff signaling. The transmission-off starting time and transmission-off duration information of the inter-frequency handoff signaling can be exchanged between the base station and the mobile station as described below.

If the base station sets a reference time during communication with the mobile station and commands the mobile station to measure the channel condition of the second frequency for 3 power control groups (PCGs) beginning at the $6^{th}$ power control group of the $15^{th}$ frame from the set reference time, then the mobile station sends an ACK message and measures the channel condition of the different channel at the specific duration determined by the inter-frequency handoff signaling. Alternatively, the mobile station can set the reference time and exchange, with the base station, information about how many times to measure the channel state of the second frequency. That is, in the case where the channel condition is measured using the inter-frequency handoff signaling, when the measured value is lower than the threshold, re-measurement instruction can be received after a lapse of a predetermined time. In this case, the second frequency is measured several times. When the measured value is smaller than the threshold, it is possible to measure the channel condition of another target frequency. With reference to the accompanying drawings, a detailed description will now be made regarding how to control the transmission power of the mobile station and the base station according to an embodiment of the present invention.

Figure 3:
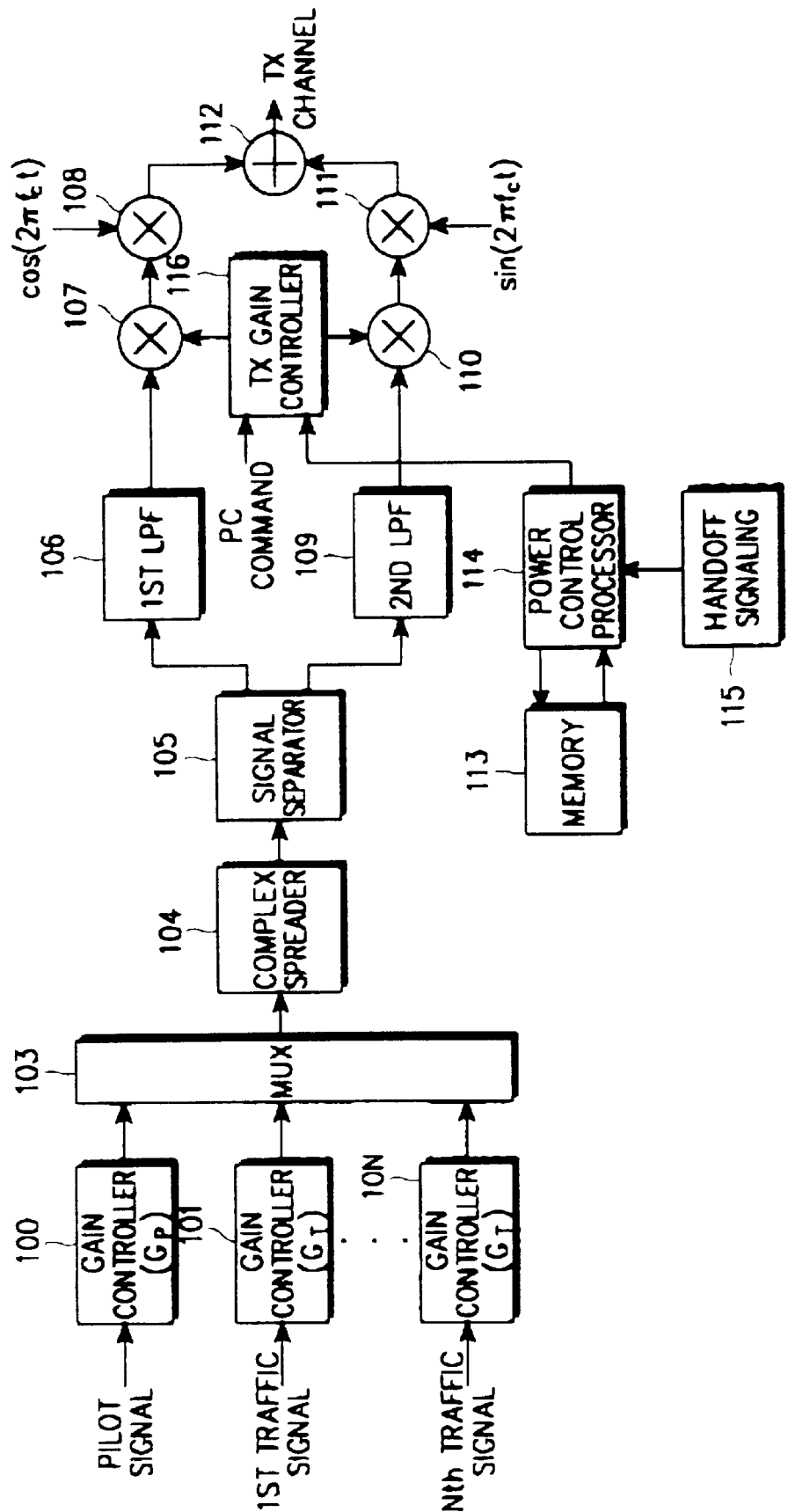
FIG. 3 shows a transmitter according to an embodiment of the present invention.

FIG. 3 shows a transmitter according to an embodiment of the present invention, wherein this transmitter can be used by both the mobile station and the base station.

Referring to FIG. 3, a pilot signal gain controller 100 controls the gain of an input pilot signal, and first to Nth traffic signal gain controllers 101–10N control the gains of the first to Nth input traffic signals. A multiplexer 103 multiplexes the outputs of the gain controllers 100–10N. A complex spreader 104 multiples the output signal of the multiplexer 103 by a PN code to spread the output signal. A signal separator 105 separates the output of the complex spreader 104 into a real part and an imaginary part. A first lowpass filter 106 lowpass-filters the real part signal output from the signal separator 105, and a second lowpass filter 109 lowpass-filters the imaginary part signal output from the signal separator 105.

A multiplier 107 multiplies the output of the first lowpass filter 106 by a gain control signal provided from a transmission gain controller 116, and a multiplier 110 multiplies the output of the second lowpass filter 109 by a gain control signal provided from the transmission gain controller 116. The transmission gain controller 116 determines transmission power using a received power control command and information (e.g., power gain value) provided from a power control processor 114, and generates the corresponding gain control signals to the multipliers 107 and 110. The received power control command is either a power-up command or a power-down command, and the step size of the power control command is previously determined. The power control step size can be ±1dB.

A memory 113 stores information about the traffic signal type, such as voice, character, image and moving picture, information about the data rate, and power gain values corresponding to the length of the transmission-off duration. Handoff signaling data 115 includes information about transmission-off starting time (i.e., a starting time for measuring the channel condition of the target frequency) for the inter-frequency handoff, and information about the length of the transmission-off duration. The power control processor 114 controls the power gain in the frame for measuring the channel condition of the second frequency for the inter-frequency handoff. That is, the power control processor 114 reads a power gain value from the memory 113 depending on the handoff signaling data 115 and provides the read power gain value to the transmission gain controller 116.

A modulator 108 multiplies an output signal of the multiplier 107 by a carrier signal cos(2πf$_c$t), and a modulator 111 multiplies an output signal of the multiplier 110 by a carrier signal sin(2πf$_c$t). An adder 112 adds an output signal of the modulator 108 and an output signal of the modulator 111, and outputs the added signals over a transmission channel.

In operation, the orthogonal code spread pilot signal is gain controlled by the gain controller 100 and then provided to the multiplexer 103. Further, the traffic data is binary-mapped such that data of '0' is converted to '+1' and data of '1' to '-1', after channel coding, repeating and channel interleaving, orthogonal code spreading, and then the orthogonal code spread signal is provided to the first to Nth traffic signal gain controllers 101–10N as first to Nth traffic signals. The first to Nth traffic signals are gain controlled by the first to Nth traffic signal gain controllers 101–10N and then provided to the multiplexer 103. In a synchronous CDMA system, the pilot signal corresponds to a pilot channel and the first to Nth traffic signals correspond to N traffic channels. In an asynchronous CDMA system, the pilot signal can be DPCCH (Dedicated Physical Control Channel) which contains a pilot symbol, a power control bit (PCB), and a data rate information bit (Traffic Format Configuration Index), and the first traffic signal can be traffic data (Dedicated Physical Data Channel). In the synchronous CDMA system, the respective channels are multiplied by the unique orthogonal codes before entering the gain controllers 100–10N in order to separate the channels. Thereafter, the pilot channel and the first to Nth traffic channels are multiplexed by the multiplexer 103 and then provided to the complex spreader 104. In the asynchronous CDMA system, the multiplexer 103 can arrange the input data in the sequence of the pilot symbol, power control bit, data rate information bit and traffic data. Therefore, it can be noted that the present invention can be used for both the synchronous CDMA system and the asynchronous CDMA system.

The output of the multiplexer 103 is spread by the complex spreader 104 and then divided into the real part (or I channel part) and the imaginary part (or Q channel part) by the signal separator 105. The real part is provided the first lowpass filter 106 and the imaginary part is provided to the second lowpass filter 109. The outputs of the first and second lowpass filters 106 and 109 are multiplied by the output of the transmission gain controller 116 by the multipliers 107 and 110, respectively, so as to control transmission power. The transmission gain controller 116 determines transmission power using the power control command and the power gain value provided from the power control processor 114. The power control command includes the power-up command and the power-down command, and the power control step size is previously determined. The power control step size can be ±1 dB.

The power control processor 114 controls the power gain in the frame in which the channel condition of the second frequency is measured for the inter-frequency handoff. The power control processor 114 determines the power gain value using power gain information, stored in the memory 113, based on the handoff signaling data 115 and experimental data. The memory 113 stores power gain information about the traffic signal type, such as voice, character, image and moving picture, information about a data rate, and a power gain value corresponding to the length of the transmission-off duration. The handoff signaling data 115 includes information about the starting time and duration for measuring the channel condition of the second frequency for the inter-frequency handoff. The transmission gain signal output from the transmission gain controller 116 is determined by adding the step size of the power control command to the power gain value provided from the power control processor 114. The outputs of the multipliers 107 and 110 are modulated with the carrier signals by the multipliers 108 and 111, respectively. The modulated signals are added by the adder 112 and transmitted over the transmission channel.

In FIG. 3, when the mobile station or the base station measures the channel condition of the second frequency in a specific frame, the power control processor 114 calculates the power loss of the traffic signal, which is punctured depending on the information about the transmission-off duration in the corresponding frame, determines a compensation gain for compensating for the power loss, and provides the determined compensation gain to the transmission gain controller 116. The compensation gain compensates for the loss of the transmission power before and after the transmission-off starting time in one frame. The compensation gain $G_c$, is defined as:

$$G_C = \sqrt{\frac{L_F}{L_P}} \quad (1)$$

where $L_F$ denotes the full length of a non-punctured frame and $L_p$ denotes a partial length of a non-punctured part of the frame. The transmission-off starting time point can be located at the head, middle or rear of a frame, or can be located over two frames. The length of transmission-off duration can be either fixed or varied. However, the maximum length should be limited by taking the error rate of the traffic signal into consideration.

Figure 4:
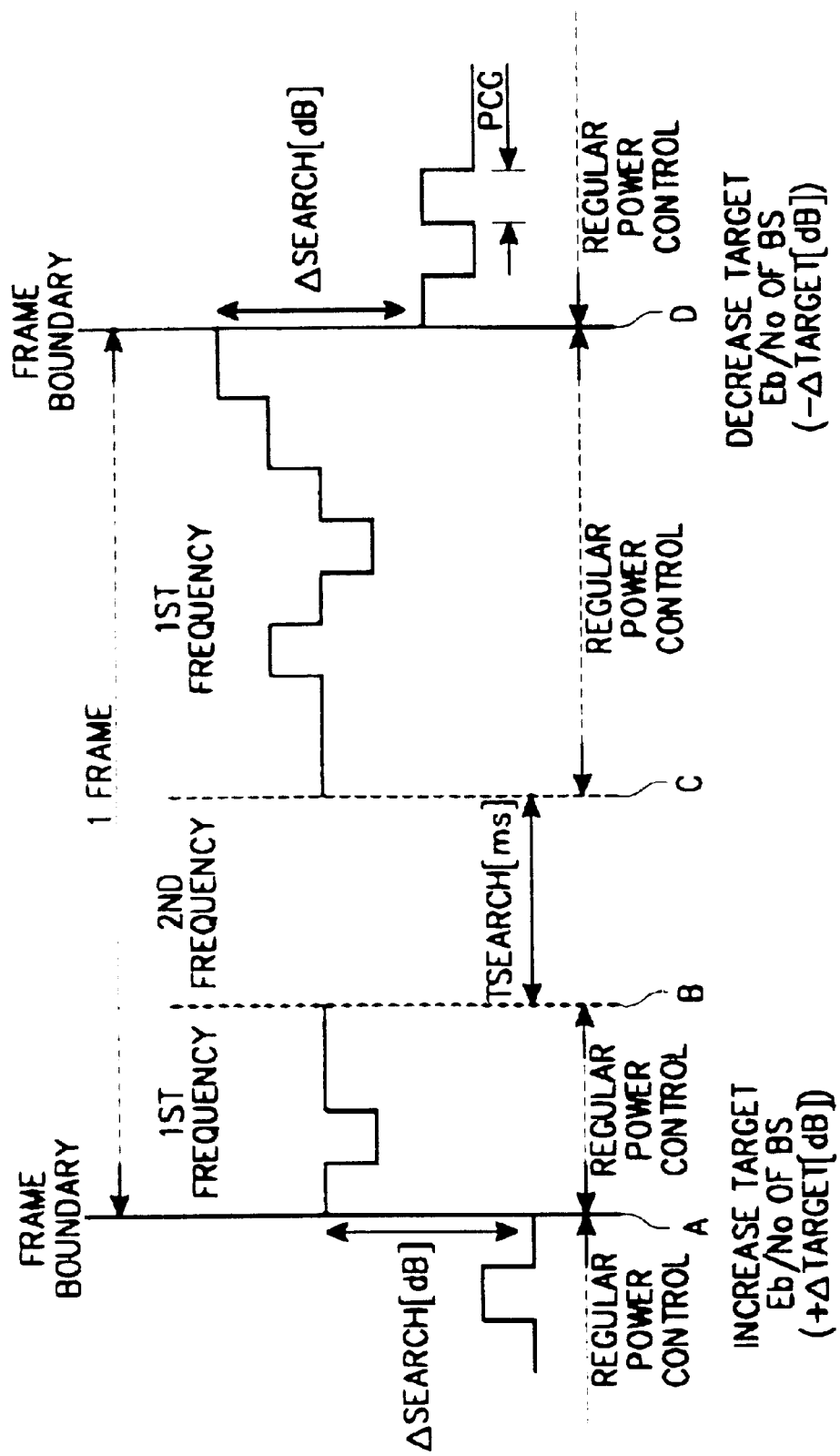
FIG. 4 shows an example of variation in transmission power of a mobile station during an inter-frequency handoff according to an embodiment of the present invention.

FIG. 4 shows a variation in transmission power of the mobile station during the inter-frequency handoff according to an embodiment of the present invention.

Referring to FIG. 4, before time A, the mobile station transmits the signal while performing regular power control, and then, starting at time A, the mobile station increases the transmission power by Asearch $\Delta_{search}$ [dB]. At this point, the base station increases, by $\Delta_{target}$ [dB], the power control threshold (i.e., target $E_b/N_o$) for power control at frame durations A–D for the inter-frequency handoff. Here, since the base station knows the transmission-off duration of the mobile station through the inter-frequency handoff signaling, the base station can change the power control threshold in sync with the transmission-off duration. The increment $\Delta_{target}$ [dB] of the power control threshold (target $E_b/N_o$) can be varied depending on the length of the duration $t_{search}$ [ms] or determined by an experimental value. Therefore, even though the transmission power is increased by $\Delta_{Search}$ [dB] at the frame starting point, it is possible to perform regular power control, since the base station has increased the power control threshold used for generating the power control command. Between time B and time C, the mobile station shifts the frequency from the first frequency to the second frequency to measure the channel condition of the second frequency, and measures power of the traffic signal and pilot signal received at the second frequency. At time C, the mobile station changes from the second frequency back to the first frequency and transmits the transmission signal at the first frequency while performing regular power control. At time D where the frame ends, the mobile station decreases the transmission power by $\Delta_{search}$ [dB], and, at the same time, the base station decreases the power control threshold by $\Delta_{target}$ [dB]. From then on, the system continuously performs the regular power control.

Figure 5:
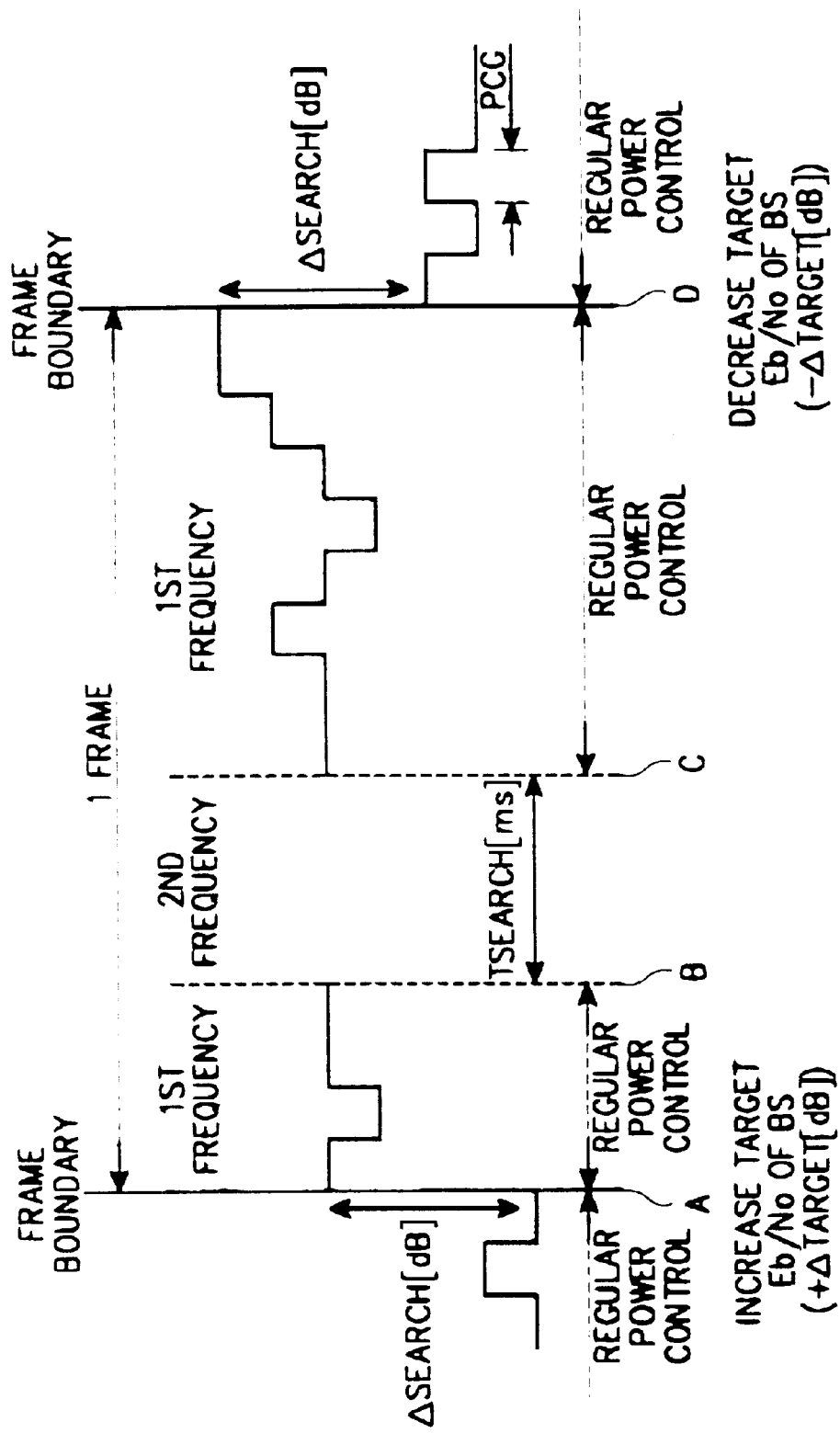
FIG. 5 shows an example of variation in transmission power of a base station during an inter-frequency handoff according to an embodiment of the present invention.

FIG. 5 shows a variation in transmission power of the base station according to an embodiment of the present invention. Before time A, the base station transmits the signal while performing regular power control, and, starting at time A, the base station increases transmission power by $\Delta_{search}$ [dB]. At this point, the mobile station increases, by $\Delta_{target}$ [dB], the power control threshold (i.e., target $E_b/N_o$) for power control at the frame durations A–D for the inter-frequency handoff. Here, since the mobile station knows the transmission-off duration of the base station through the inter-frequency handoff signaling, the mobile station can change the power control threshold in sync with the transmission-off duration. Therefore, even though the transmission power is increased by $\Delta_{search}$ [dB] at the frame starting point, it is possible to perform the regular power control because the mobile station has increased the power control threshold used for generating the power control command. Between time B and time C, the base station shifts the frequency from the first frequency to the second frequency to measure the channel condition of the second frequency, and measures power $E_c$ of the traffic signal received at the second frequency or the traffic signal-to-interference ratio $E_c/I_{or}$. At time C, the base station changes from the second frequency back to the first frequency and transmits the transmission signal at the first frequency while performing regular power control. At time D where the frame ends, the base station decreases the transmission power by $\Delta_{search}$ [dB], and, at the same time, the mobile station decreases the power control threshold (target $E_b/N_o$) by $\Delta_{target}$ [dB], and then continuously performs the regular power control.

Figure 6:
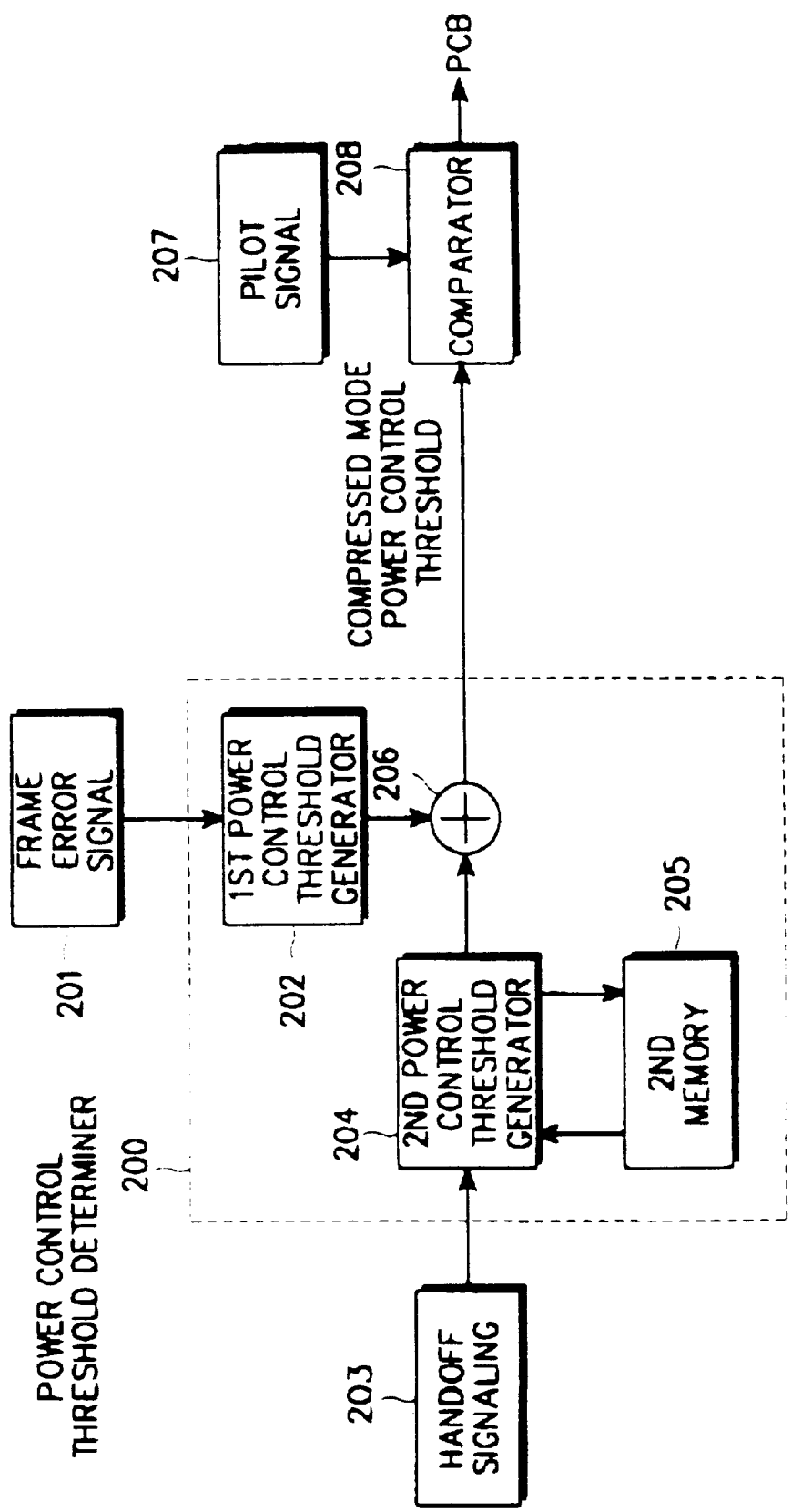
FIG. 6 shows a scheme for determining a power control threshold for the compressed mode according to an embodiment of the present invention.

FIG. 6 shows a scheme for determining the power control threshold according to an embodiment of the present invention. The scheme of FIG. 6 can be used in either the base station or the mobile station. When the mobile station measures the channel condition of the second frequency in the reverse link, the power control threshold refers to a power control threshold of the base station. When the base station measures the channel condition of the second frequency in the forward link, the power control threshold refers to a power control threshold of the mobile station. In FIG. 6, the process for processing the signal received over the transmission channel is shown in brief, for simplicity.

Referring to FIG. 6, a frame error signal 201, indicating whether there is a frame error, is generated through CRC (Cyclic Redundancy Code) checking after channel decoding. If a frame error occurs, a first power control threshold generator 202 increases the power control threshold according to the service type and a target frame error rate. Otherwise, if a frame error does not occur, the first power control threshold generator 202 decreases the power control threshold. Changing the power control threshold is referred to as outer-loop power control. The threshold changing step size is variable depending on the service type, such as the voice, character, image and moving picture, and the service quality. A second power control threshold generator 204 operates according to whether there is handoff signaling data 203. If there is no handoff signaling data 203, the second power control threshold generator 204 provides a value '0' to an adder 206. Otherwise, if there is handoff signaling data 203, the second power control threshold generator 204 reads an increment $\Delta_{target}$ [dB] of the power control threshold for the compressed mode from a memory 205 depending on the inter-frequency handoff information included in the handoff signaling data 203, and provides the read value to the adder 206.

The memory 205 stores information about the traffic signal type and the increment of the power control threshold according to the transmission-off duration of the frame. That is, the increment $\Delta_{target}$ [dB] of the power control threshold for the compressed mode can be varied depending on the length of the duration $t_{search}$ [ms] or determined by experimental values. The adder 206 adds the power control threshold output from the first power control threshold generator 202 and the increment of the power control threshold output from the second power control threshold generator 204. A pilot measurer 207 measures the power of the received pilot signal and provides the measured value to a comparator 208. The comparator 208 compares the power of the received pilot signal with the power control threshold. The comparator 208 generates a power-up command, if the threshold is higher than the power of the received pilot signal. Otherwise, if the power control threshold is lower than the power of the received pilot signal, the comparator 208 generates a power-down command.

The devices of FIGS. 3 and 6 can be used by both the mobile station and the base station. For convenience, a description of the invention will be made with reference to the case where the device of FIG. 3 corresponds to the mobile station and the device of FIG. 6 corresponds to the base station.

The mobile station having the transmitter of FIG. 3 increases the transmission power by $\Delta_{search}$ [dB] by enabling the power control processor 114 of FIG. 3 at the beginning of the frame, in which it is expected to measure the channel condition of the second frequency for the inter-frequency handoff. At the same time, the base station of FIG. 6 increases the power control threshold by $\Delta_{target}$ [dB] by means of the second power control threshold generator 204. The two processes can be simultaneously performed, because both the mobile station and the base station know the information about the starting time and duration for measuring the channel condition of the second frequency through the inter-frequency handoff signaling. Meanwhile, the mobile station decreases the transmission power by $\Delta_{search}$ [dB] by enabling the power control processor 114 of FIG. 3 at the end of the frame, where the channel condition of the second frequency was measured for the inter-frequency handoff, and, at the same time, the base station decreases the power control threshold by $\Delta_{target}$ [dB] using the second power control threshold generator 204 of FIG. 6.

Next, a description of the invention will be made with reference to a case where FIG. 3 corresponds to the base station and FIG. 6 corresponds to the mobile station. The base station increases the transmission power by $\Delta_{search}$ [dB] by enabling the power control processor 114 of FIG. 3 at the beginning of the frame where the channel condition of the second frequency will be measured for the inter-frequency handoff. At the same time, the mobile station increases the power control threshold by $\Delta_{target}$ [dB] by means of the second power control threshold generator 204 of FIG. 6. In addition, the base station decreases the transmission power by $\Delta_{search}$ [dB] by enabling the power control processor 114 of FIG. 3 at the end of the frame, where the channel condition of the second frequency was measured for the inter-frequency handoff, and, at the same time, the mobile station decreases the power control threshold by $\Delta_{target}$ [dB] using the second power control threshold generator 204 of FIG. 6.

Figure 7:
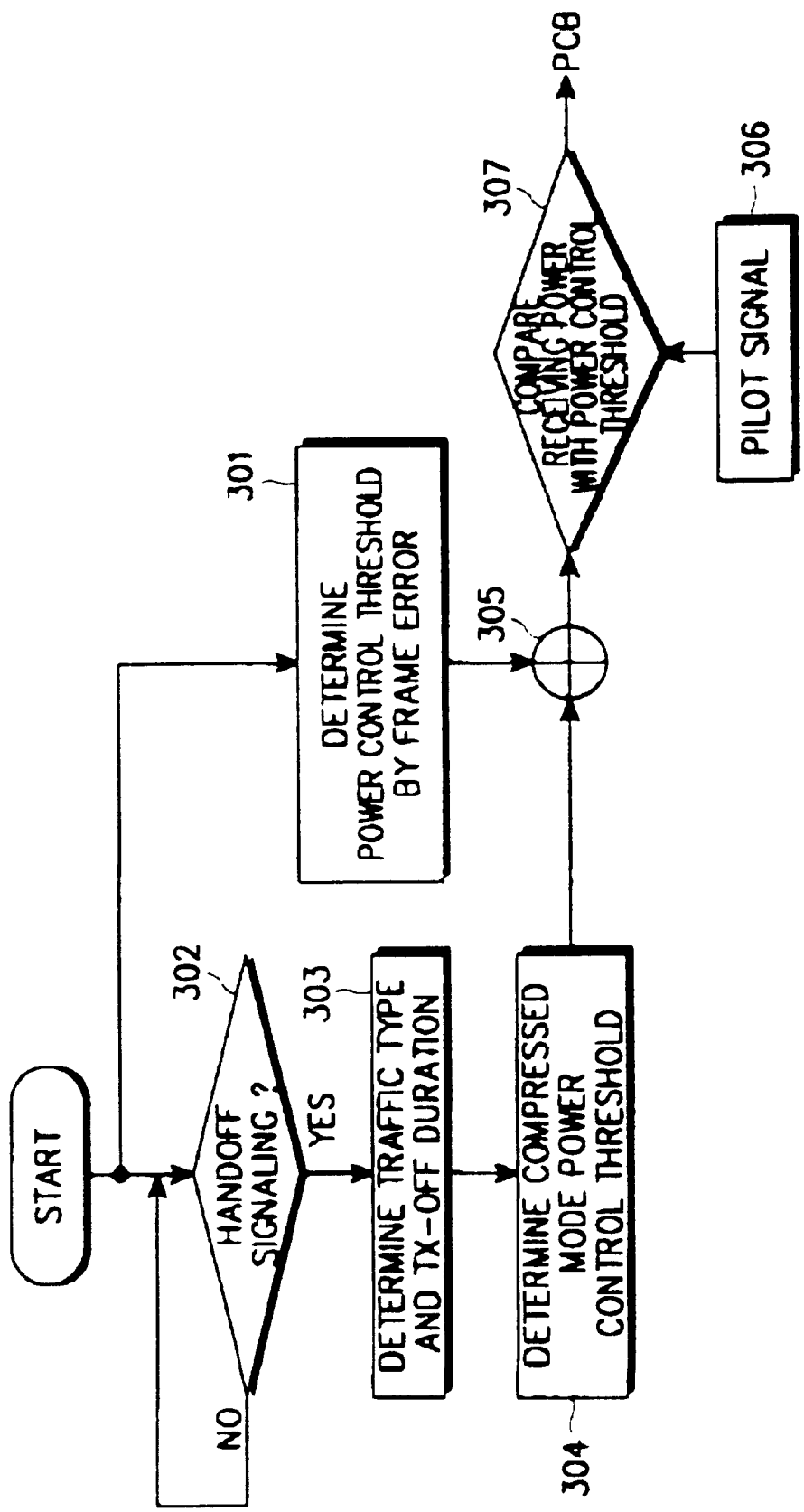
FIG. 7 shows a procedure for determining a power control threshold for the compressed mode performed in FIG. 6.

FIG. 7 shows the procedure for determining the power control threshold in the device of FIG. 6. This procedure can be applied to both the base station and the mobile station. For convenience, a description of the preferred embodiment of the present invention will be made with reference to the mobile station.

Referring to FIG. 7, after checking whether or not a frame error occurs through CRC checking after channel decoding, the mobile station determines in step 301 a power control threshold for the frame error according to the service type and the target frame error rate. The step 301 is always performed regardless of inter-frequency handoff. The mobile station determines in step 302 whether or not there is handoff signaling data. If there is no handoff signaling data, the power control threshold for the compressed mode, the output of step 304, becomes '0'. Otherwise, if there is handoff signaling data, the mobile station determines, in step 303, the information about the length of the transmission-off duration and the traffic type for measuring the channel condition of the second frequency. Such information is included in the handoff signaling data and is known to both the mobile station and the base station. Further, in step 304, the mobile station determines the power control threshold increment, using the above information. In step 305, the mobile station adds the power control threshold by the frame error and the power control threshold increment determined by the handoff signaling data, to determine the final power control threshold for the compressed mode. Thereafter, in step 307, the mobile station compares the power control threshold for the compressed mode with the power of the pilot signal transmitted from the base station. When the pilot signal power is lower than the power control threshold, the mobile station generates a power-up command. Otherwise, when the pilot signal power is higher than the power control threshold, the mobile station generates a power-down command.

The novel power control method increases the transmission power of the mobile station (or base station) at the beginning of the frame by an amount equal to the power lost during the measurement of the second frequency, and changes the threshold for the pilot signal receiving power of the base station (or mobile station) in order to perform regular power control within the frame which includes the power loss duration. Although the present invention has been described with reference to an embodiment where the channel condition of the second frequency is measured at the middle of the frame, it is also possible to apply the invention to a case where the channel condition is measured at a power control group located in the front or rear of the frame. In addition, it is also possible to measure the channel condition of the second frequency over two frames. In this case, since transmission of the rear portion of the leading frame and the front portion of the following frame are interrupted, compensation for the power loss due to the transmission-off is performed on the portions other than the transmission-off portions of the leading and following frames.

Further, the invention has been described with reference to an embodiment where the base station and the mobile station exchange the information about the transmission-off starting point and duration, using inter-frequency handoff signaling. However, it is also possible to measure the channel condition of the second frequency using a fixed transmission starting time and duration previously determined in the mobile station and the base station. In this case, if the channel condition of the second frequency is measured at a fixed location and for a fixed duration in the frame, the inter-frequency handoff signaling information exchanged between the mobile station and the base station would only include information about which frame contains the transmission-off duration.

As described above, in the mobile communication system, the novel power control method during inter-frequency handoff can perform rapid and accurate power control. Therefore, the mobile station can prevent transmission power from being unnecessarily consumed by disregarding the power-down command during a frame duration which includes the target frequency measurement duration, thereby increasing the battery run-time of the mobile station. In addition, the invention can reduce interference to other channels, caused by the unnecessary transmission power.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A power control method for a mobile station having transmission frames, at least one compressed mode transmission frame including a transmission duration when data is transmitted on a first frequency, and a transmission-off duration for searching another frequency in order to perform an inter-frequency handoff, said transmission duration having increased transmission power, the method comprising the steps of:

resetting, in a base station, a power control threshold depending on a length of the transmission-off duration; and receiving, in the base station, transmission power-increased data;

comparing a power of a received signal with the power control threshold;

generating a power-up command when the power control threshold is higher than the received signal power; and generating a power-down command when the power control threshold is lower than the received signal power.

2. The power control method as claimed in claim 1, wherein the mobile station controls a power of a transmitted signal according to the power-up command and the power-down command.

3. A power control method for a mobile station having transmission frames, at least one compressed mode transmission frame including a transmission duration when data is transmitted on a first frequency, and a transmission-off duration for searching another frequency in order to perform an inter-frequency handoff, said transmission duration having increased transmission power, the method comprising the steps of:

setting, in a base station, a power control threshold depending on a length of the transmission-off duration and a data error of a frame preceding said at least one compressed mode frame;

receiving, in the base station, transmission power-increased data;

comparing a power of a received signal with the power control threshold;

generating a power-up command when the power control threshold is higher than the received signal power; and generating a power-down command when the power control threshold is lower than the received signal power.

4. The power control method as claimed in claim 3, wherein the mobile station controls a power of a transmitted signal according to the power-up command and the power-down command.

5. A power control method for a mobile station having transmission frames, at least one compressed mode transmission frame including a transmission duration when data is transmitted on a first frequency, and a transmission-off duration for searching another frequency in order to perform an inter-frequency handoff, said transmission duration having increased transmission power, the method comprising the steps of:

changing a power control threshold depending on a length of the transmission-off duration;

generating, in a base station, a power control command based on the power control threshold; and increasing or decreasing transmission power according to the power control command.

6. A power control device in a CDMA (Code Division Multiple Access) communication system having transmission frames, at least one compressed mode transmission frame including a transmission duration when data is transmitted on a first frequency, and a transmission-off duration for searching another frequency in order to perform an inter-frequency handoff to a second frequency, said transmission duration having increased transmission power in order to compensate for a loss of transmission power on the first frequency during the transmission-off duration, the device comprising:

a first power control threshold generator for determining a first power control threshold depending on whether a frame preceding said at least one compressed mode frame has a data error;

a second power control threshold generator for determining an increment to the first power control threshold depending on a length of the transmission-off duration;

an adder for adding the first power control threshold and the increment to the first power control threshold, to output a final power control threshold;

a detector for detecting a received power of a pilot signal; and comparator for comparing the received power of the pilot signal with the final power control threshold, to generate a power control command.

7. The power control device as claimed in claim 6, further comprising:

a receiver for receiving the power control command; and a transmitter for increasing or decreasing transmission power according to the power control command for said at least one compressed mode frame.

8. A method for controlling transmission power within at least one frame, said at least one frame including a transmission-off duration for searching a different frequency, comprising the steps of:

increasing, in a base station, a power control threshold depending on a length of the transmission-off duration;

providing, in a base station, a power control command according to the power control threshold;

increasing or decreasing transmission power in a mobile station by a predetermined step during a transmission duration in said at least one frame, said increase or decrease being made according to the power control command.

9. A power control method for a mobile communication system which includes at least one compressed mode frame, where data is not transmitted for a transmission-off duration in the at least one compressed mode frame, and said data not transmitted in the transmission-off duration is transmitted at a increased data rate at increased transmission power in the at least one compressed mode frame, the method comprising the steps of:

upon receipt of a compressed mode frame, increasing a power control threshold;

receiving a signal for a transmission duration, said transmission duration being any portions during the compressed mode frame;

comparing a power of the received signal with the power control threshold;

transmitting a power-up command when the power control threshold is higher than the received signal power; and transmitting a power-down command when the power control threshold is lower than the received signal power.

10. The power control method as claimed in claim 9, wherein the power control threshold is changed according to a length of the transmission-off duration in the compressed mode frame.

11. The power control method as claimed in claim 9, wherein, after completion of receiving the compressed mode frame, the power control threshold is decreased by an increment of the power control threshold.

12. The power control method as claimed in claim 9, wherein the power control threshold is a closed-loop power control threshold.

13. The power control method as claimed in claim 9, wherein the received signal power is a received power of a pilot signal received together with the received signal.

* * * * *